United States Patent
Woods et al.

(10) Patent No.: US 9,814,994 B1
(45) Date of Patent: Nov. 14, 2017

(54) NOISE MAKING ASSEMBLY FOR TOYS

(71) Applicant: HYPER PET LLC, Wichita, KS (US)

(72) Inventors: Randall J. Woods, Wichita, KS (US); Sonia S. Cox, Andover, KS (US)

(73) Assignee: Hyper Pet LLC, Wichita, KS (US)

( * ) Notice: Subject to any disclaimer, the term of this patent is extended or adjusted under 35 U.S.C. 154(b) by 0 days.

(21) Appl. No.: 15/356,898

(22) Filed: Nov. 21, 2016

(51) Int. Cl.
*A63H 3/28* (2006.01)
*A01K 29/00* (2006.01)
*A63H 5/00* (2006.01)
*A01K 15/02* (2006.01)

(52) U.S. Cl.
CPC .............. *A63H 3/28* (2013.01); *A01K 15/025* (2013.01); *A63H 5/00* (2013.01)

(58) Field of Classification Search
CPC ....... A63H 3/28; A01K 15/025; A01K 15/026
USPC .................. 446/184, 188, 207, 213; 119/707
See application file for complete search history.

(56) References Cited

U.S. PATENT DOCUMENTS

| | | | | |
|---|---|---|---|---|
| 754,148 A * | 3/1904 | Kuhlemann | ............. | A63H 3/28 223/67 |
| 1,668,785 A * | 5/1928 | Smart | ...................... | A63H 3/06 43/3 |
| 2,616,217 A * | 11/1952 | Wild | ........................ | A63H 5/00 24/104 |
| 2,745,214 A * | 5/1956 | Lawson | ................... | A63H 3/28 446/184 |
| 2,819,558 A * | 1/1958 | Freimauer | ................ | A63H 3/28 446/184 |
| 2,928,208 A * | 3/1960 | Wintriss | .................... | A63H 5/00 411/918 |
| 3,075,317 A * | 1/1963 | Craft | ........................ | G10D 7/12 446/207 |
| 3,238,573 A | 3/1966 | Pease | | |
| 3,702,038 A * | 11/1972 | Hakim | ..................... | A63H 3/28 446/184 |
| 3,892,085 A * | 7/1975 | Palumbo | .................. | A63H 3/28 446/213 |
| RE29,050 E * | 11/1976 | Hakim | ..................... | A63H 3/28 446/177 |
| 7,066,779 B2 * | 6/2006 | Willinger | ................. | A63H 3/28 119/707 |
| 7,201,117 B2 * | 4/2007 | Ritchey | ................ | A01K 15/025 119/707 |
| 7,597,065 B2 * | 10/2009 | Jager | ..................... | A01K 15/025 119/709 |
| 7,665,423 B2 * | 2/2010 | Ritchey | ................ | A01K 15/025 119/702 |
| 7,736,213 B2 * | 6/2010 | Willinger | ................. | A63H 3/28 119/707 |

(Continued)

*Primary Examiner* — Alexander Niconovich
(74) *Attorney, Agent, or Firm* — Hovey Williams LLP

(57) ABSTRACT

A noise making assembly for a toy having a compressible bladder with an orifice for permitting air to pass in and out of the bladder. The noise making assembly includes a noise producing element and a housing for supporting the noise producing element proximate the orifice. The housing includes a hollow body portion, an enlarged concave-shaped head attached to the first open end of the body portion for preventing the housing from being pushed inside the bladder, and a number of circumferentially-spaced prongs attached to the outer wall of the body portion to prevent the noise making assembly from becoming dislodged from the bladder.

13 Claims, 3 Drawing Sheets

(56) References Cited

U.S. PATENT DOCUMENTS

| | | | | |
|---|---|---|---|---|
| 7,950,352 B2 * | 5/2011 | Specht | ............... | A01K 15/026 |
| | | | | 119/707 |
| 8,186,309 B2 * | 5/2012 | Specht | ............... | A01K 15/025 |
| | | | | 119/707 |
| 8,322,308 B2 * | 12/2012 | Curry | ................ | A01K 15/025 |
| | | | | 119/702 |
| 8,468,977 B2 * | 6/2013 | Markham | ............ | A01K 15/025 |
| | | | | 119/709 |
| 2012/0090554 A1 * | 4/2012 | Nunn | ................ | A01K 15/025 |
| | | | | 119/707 |
| 2014/0109841 A1 * | 4/2014 | Vap | .................. | A01K 29/00 |
| | | | | 119/707 |
| 2015/0289482 A1 * | 10/2015 | Nunn | ................ | A01K 15/025 |
| | | | | 119/709 |

* cited by examiner

NOISE MAKING ASSEMBLY FOR TOYS

BACKGROUND

Pet toys and children's toys often include squeakers or other noise making assemblies for making noises when the toys are compressed and decompressed. These noise making assemblies often get pushed inside the toys such that they no longer make noises or become dislodged from the toys and become choking hazards. This is especially true for pet toys designed for dogs, which are often subjected to vigorous chewing. Accordingly, there is a need for an improved noise making assembly for toys that overcomes the limitations of the prior art.

SUMMARY

The present invention solves the above described problems by providing a noise making assembly that is less prone to being pushed inside or dislodged from a toy.

A noise making assembly constructed in accordance with an embodiment of the invention is configured for insertion in a toy having a compressible bladder with an orifice for permitting air to pass in and out of the bladder when the toy is compressed or decompressed. The noise making assembly broadly comprises a noise producing element and a housing for supporting the noise producing element proximate the orifice of the bladder.

The noise producing element may be a reed-type noise maker, a whistle-type noise maker, or any other device that makes noise when subjected to air movement.

The housing comprises a hollow body portion that fits within the orifice of the bladder. The body portion includes a sidewall having inner and outer surfaces that define an interior cavity for receiving the noise producing element and first and second open ends for passing air over the noise producing element as the air exits or enters the orifice.

The housing further comprises an enlarged concave-shaped head attached to the first open end of the body portion. The head rests against an outer surface of the bladder adjacent the orifice for preventing the housing from being pushed inside the toy and has at least one opening in pneumatic communication with the interior cavity of the body portion to permit air to pass therethrough. In one embodiment, the diameter of the head is at least twice the diameter of the body portion and the orifice so that the housing cannot be easily pushed inside the toy.

The housing further comprises a number of circumferentially-spaced prongs attached to the outer wall of the body portion to prevent the noise making assembly from being pushed out of and dislodged from the bladder. Each prong has a base attached to the outer wall of the body portion and a tip that extends upwardly at an angle toward the head. The tips of the prongs are spaced from the inside surface of the head so that the outer wall of the bladder is sandwiched between the prongs and the head for holding the housing firmly in the orifice of the bladder. Thus, the head and the prongs cooperate to firmly hold the housing in the orifice of the bladder and prevent the noise making assembly from being pushed into or dislodged from the bladder.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
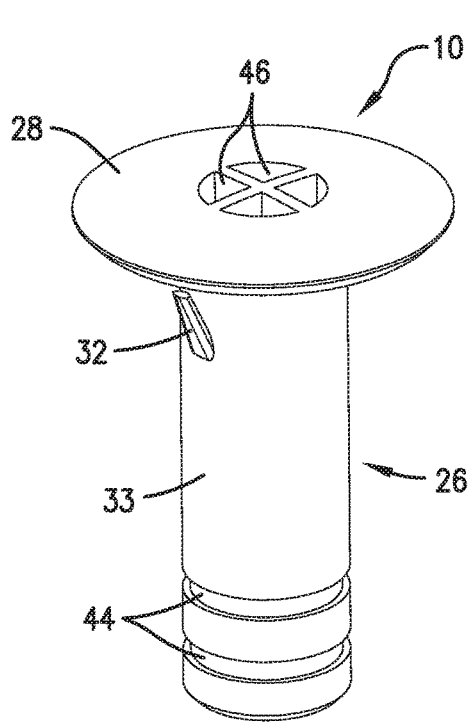
FIG. 1 is a perspective view of a noise making assembly constructed in accordance with embodiments of the present invention.
Figure 2:
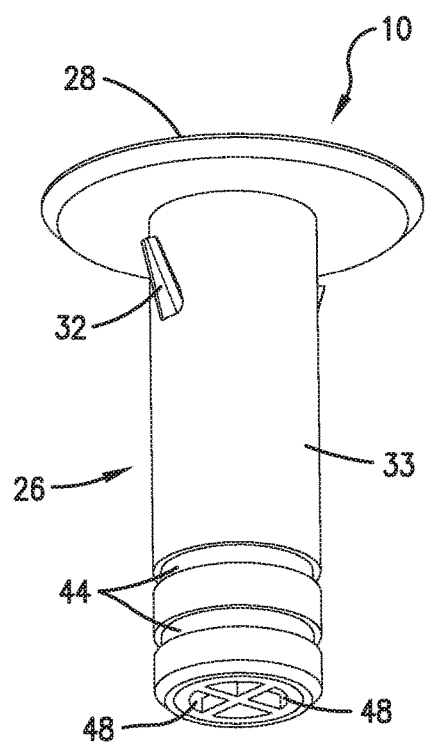
FIG. 2 is another perspective view of the noise making assembly.
Figure 3:
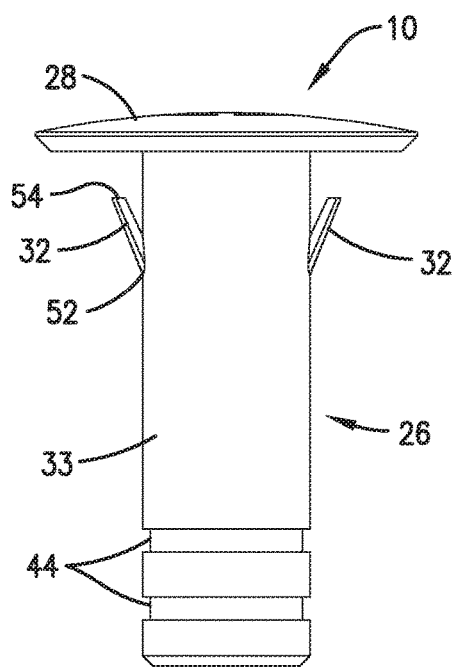
FIG. 3 is a side elevational view of the noise making assembly.
Figure 4:
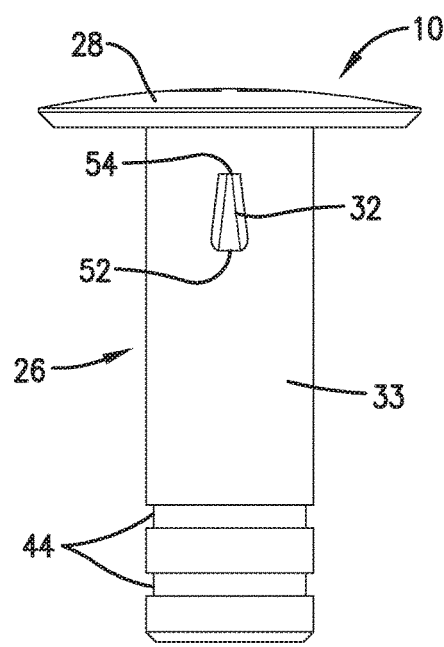
FIG. 4 is another side elevational view of the noise making assembly.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 7:
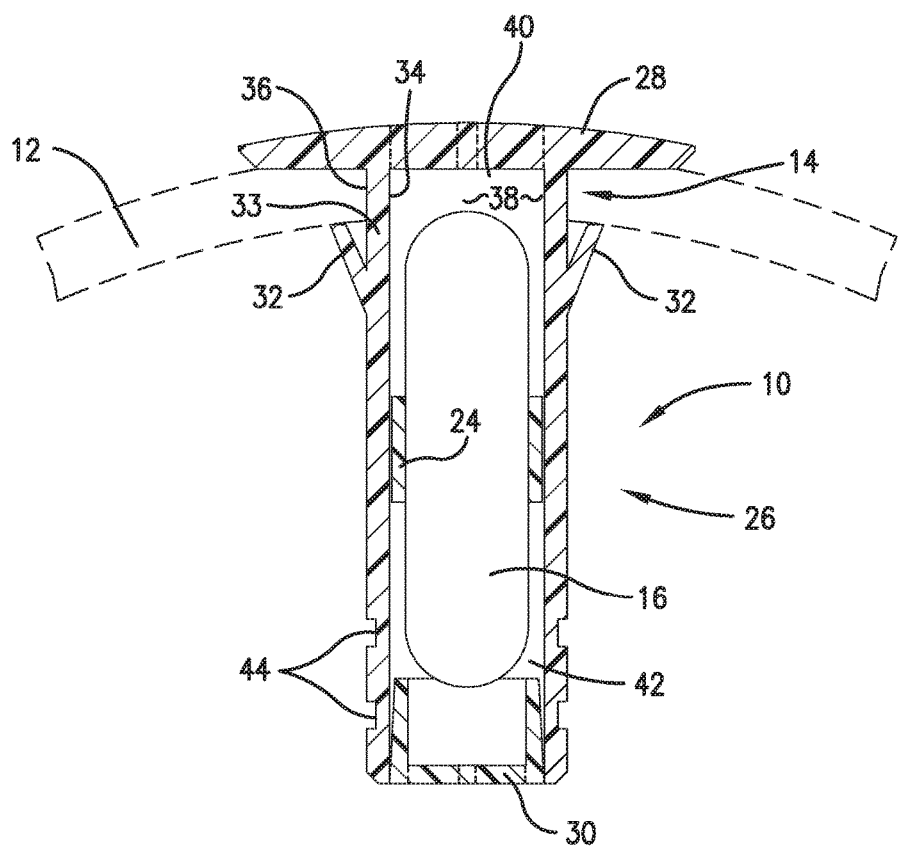
FIG. 7 is a vertical sectional view of the noise making assembly shown inserted in a bladder of a toy, with the bladder wall shown in dashed lines.

Turning now to the drawing figures, a noise making assembly 10 constructed in accordance with embodiments of the invention is illustrated. As shown in FIG. 7, the noise making assembly 10 is configured for insertion in a toy having a compressible bladder 12 with an orifice 14 formed in the bladder for permitting air to pass in and out of the bladder when the toy is compressed or decompressed. The bladder 12 is hollow and may be made of a urethane material or other flexible material that permits it to be compressed and returned to its original shape. The bladder 12 may be in the shape of a sphere, bone, disc, animal, or any other shape, may be of any size, and may be covered with felt or other flexible materials. The orifice 14 is cut or otherwise formed through the wall of the bladder 12 and may be any size.

Figure 8:
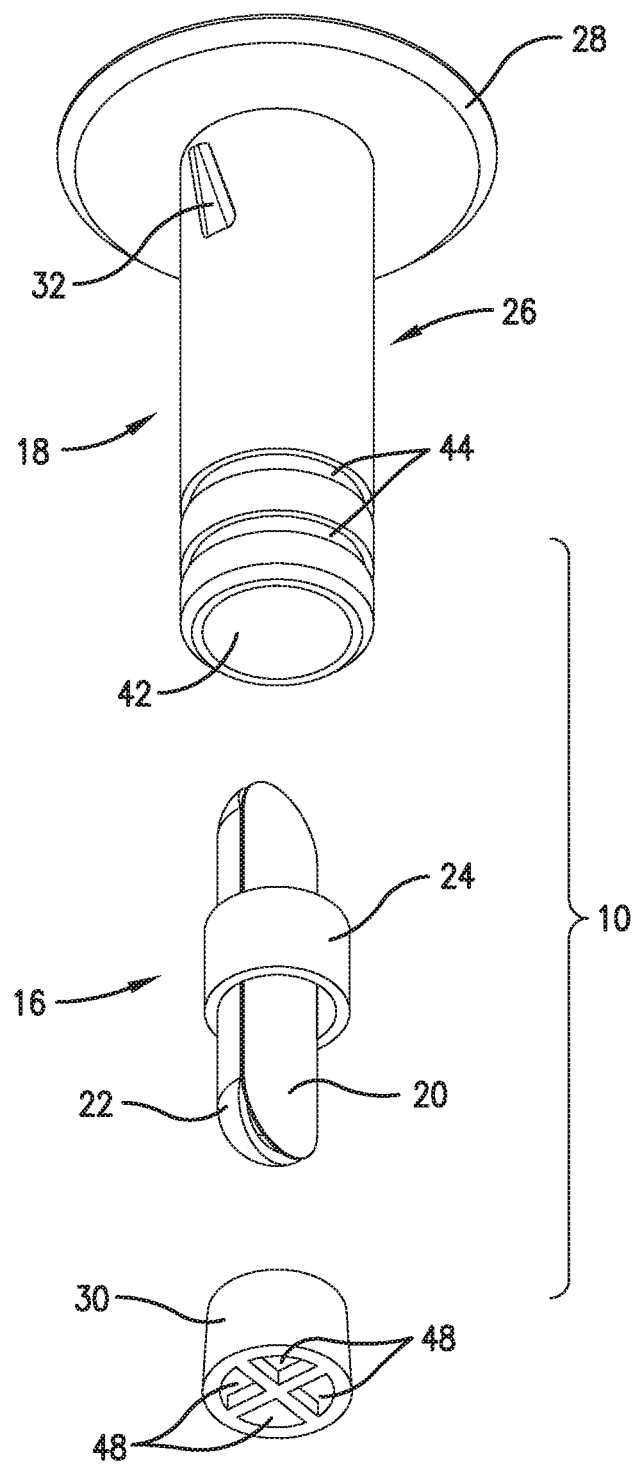
FIG. 8 is an exploded view of the noise making assembly.

An embodiment of the noise making assembly 10 is best shown in FIG. 8 and broadly comprises a noise producing element 16 and a housing 18. In some embodiments, the noise making assembly 10 is an integral part of the bladder 12 and is made and sold with the bladder. In other embodiments, the noise making assembly 10 is made and sold separately from the bladder 12 and is configured to be inserted in the bladder in a subsequent assembly step.

The noise producing element 16 is conventional and may include a reed 20 supported on a canoe-shaped platform 22 by a collar 24 that slips over the reed and the platform. The reed 20 vibrates relative to the platform 22 to make squeaks and other noises as air passes between the reed and the platform while entering or exiting the bladder 12 through the orifice 14. An embodiment of the noise producing element 16 has a reed 26 and platform 22 that are approximately 0.523" long and a collar 24 that is 0.116" long and 0.165" in diameter. The reed-type noise producing element described and illustrated herein is just one example of a noise producing element that may be used with the present invention and may be replaced with other types of noise makers without departing from the scope of the present invention.

The housing 18 supports the noise producing element 16 proximate the orifice 14 of the bladder 12 and prevents it from being pushed in or out of the bladder. In one embodiment, the housing 18 comprises a hollow body portion 26, an enlarged head 28, a cap 30, and a number of prongs 32. The housing 18 may be made of plastic or other suitable materials and may be made of any size to fit within any sized orifice 14.

The body portion 26 fits within the orifice 14 and includes a sidewall 33 having inner and outer surfaces 34, 36 that define an interior cavity 38 for receiving the noise producing element 16 as shown in FIG. 7. The sidewall 33 further defines first and second open ends 40, 42 for passing air over the noise producing element 16 as the air exits or enters the orifice 14. A pair of annular grooves 44 are formed in the outer surface 36 of the sidewall. An embodiment of the body portion is approximately 0.690" long and 0.220" in diameter, but it may be any size without departing from the scope of the invention.

Figures 5, 6:
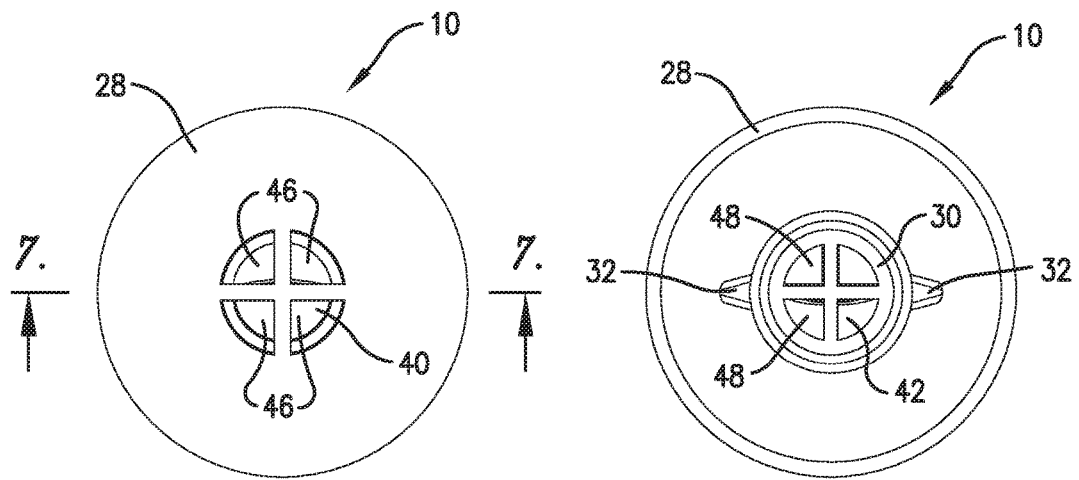
FIG. 5 is a top view of the noise making assembly.
FIG. 6 is a bottom view of the noise making assembly.

The head 28 is attached to the first open end 40 of the body portion 26 for preventing the housing 18 from being pushed inside the bladder 12. The top surface of the head 26 is concave-shaped so as to match the outer contours of the bladder as shown in FIG. 7. As best shown in FIG. 5, the head 28 has at least one opening 46 in pneumatic communication with the interior cavity 38 of the body portion to permit air to pass therethrough. The diameter of the head 28 is at least twice the diameter of the body portion 26 and the orifice 14 so that the housing cannot be easily pushed inside the toy. In one embodiment, the lower flat surface of the head 28 is 0.5" in diameter, the upper domed surface of the head is 1.25" in diameter, and the thickness of the head measured from the peak of the upper surface is 0.052".

The cap 30 closes the second open end 42 of the body portion 26 to hold the noise producing element 16 in the interior cavity 38. The cap 30 is sized to frictionally fit within the body portion, but it may also be held in place with adhesives or fasteners. As best shown in FIG. 6, the cap 30 has at least one opening 48 in pneumatic communication with the interior cavity 38 to permit air to pass therethrough. In one embodiment, the cap 30 is 0.115" long and slightly tapered along its length with its outer face having a diameter of 0.170" and its inner face having a diameter of 0.130".

The prongs 32 prevent the noise making assembly 10 from becoming dislodged from the bladder 12. In the illustrated embodiment, the housing includes two prongs attached to opposite sides of the outer wall of the body portion. In other embodiments, the housing may include any number of prongs equally spaced on the outer wall of the body. Each prong 32 has a base 52 attached to the body portion and a tip 54 that extends upwardly at an angle from the base and points toward the inside surface of the head 28.

In one embodiment, the tips 54 of the prongs 32 are spaced approximately 0.061" from the inner surface of the head 28, which is approximately equal to the thickness of the bladder wall 12 so that the bladder is sandwiched between the prongs 32 and the head 28 for holding the housing firmly in the orifice of the bladder. Thus, the enlarged head 28 and the prongs 50 cooperate to prevent the noise making assembly 10 from being pushed into or dislodged from the bladder 12. In one embodiment, the prongs 32 extend from the outer surface of the body portion at an angle of approximately 20-45 degrees, and the base 52 of each prong is wider than its tip 54.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A noise maker assembly for a toy having a compressible bladder with an orifice, the noise maker assembly comprising:
    a noise producing element; and
    a housing for supporting the noise producing element proximate the orifice, the housing comprising—
        a hollow body portion that fits within the orifice, the body portion including a sidewall having inner and outer surfaces, the inner surface defining an interior cavity with first and second open ends, wherein the noise producing element is placed within the interior cavity;
        an enlarged concave-shaped head attached to the first open end of the body portion for preventing the housing from being pushed inside the bladder, the head having at least one opening in pneumatic communication with the interior cavity of the body portion to permit air to pass therethrough; and
        only two prongs circumferentially spaced 180 degrees from each other on the sidewall, each prong having a base attached to the outer surface of the sidewall and a tip that extends in an upward direction and a radially outward direction from the base so as to point toward the head, the tips of the prongs being spaced from the head so that a wall of the bladder is sandwiched between the prongs and the head for holding the housing in the orifice and preventing the housing from being pushed into or out of the bladder, the prongs being configured to retain the housing in the orifice and to permit the housing to be inserted in the orifice when the bladder is stretched near the orifice in opposite directions coinciding with the radially outward directions of the prongs such that the orifice is expanded so that the prongs can fit through the expanded orifice.

2. The noise maker assembly set forth in claim 1, wherein the base of each prong is wider than its tip.

3. The noise maker assembly set forth in claim 1, wherein the noise producing element comprises a reed element.

4. The noise maker assembly set forth in claim 1, wherein a diameter of the head is at least twice a diameter of the body portion.

5. The noise maker assembly set forth in claim 1, further comprising a cap for closing the second open end of the body portion for preventing the noise producing element from escaping the housing, the cap having at least one opening in pneumatic communication with the interior cavity of the body portion to permit air to pass therethrough.

6. The noise maker assembly set forth in claim 1, further comprising a pair of annular grooves formed in the outer surface of the body portion.

7. A toy comprising:
a hollow flexible bladder having an outer wall, an inner wall, and an orifice formed through the inner and outer walls;
a noise maker assembly attached within the orifice, the noise maker assembly comprising:
a noise producing element; and
a housing for supporting the noise producing element proximate the orifice, the housing comprising—
a hollow body portion that fits within the orifice, the body portion including a sidewall having inner and outer surfaces, the inner surface defining an interior cavity with first and second open ends, wherein the noise producing element is placed within the interior cavity;
an enlarged concave-shaped head attached to the first open end of the body portion for preventing the housing from being pushed inside the bladder, the head having at least one opening in pneumatic communication with the interior cavity of the body portion to permit air to pass therethrough;
only two prongs circumferentially spaced 180 degrees from each other on the sidewall, each prong having a base attached to the outer surface and a tip that extends in an upward direction and a radially outward direction from the base so as to point toward the head at an angle of between 20 degrees and 45 degrees from the outer surface, the tips of the prongs being spaced from the head so that the bladder is sandwiched between the prongs and the head for holding the housing in the orifice and preventing the housing from being pushed into or out of the bladder, the prongs being configured to retain the housing in the orifice and to permit the housing to be inserted in the orifice when the bladder is stretched near the orifice in opposite directions coinciding with the radially outward directions of the prongs such that the orifice is expanded so that the prongs can fit through the expanded orifice.

8. The noise maker assembly set forth in claim 7, wherein the base of each prong is wider than its tip.

9. The noise maker assembly set forth in claim 7, wherein the noise producing element is a reed type noise maker.

10. The noise maker assembly set forth in claim 7, wherein a diameter of the head is approximately twice a diameter of the body portion.

11. The noise maker assembly set forth in claim 7, further comprising a cap for closing the second open end of the body portion for preventing the noise producing element from escaping the housing, the cap having at least one opening in pneumatic communication with the interior cavity of the body portion to permit air to pass therethrough.

12. The noise maker assembly set forth in claim 7, further comprising a pair of annular grooves formed in the outer surface of the body portion.

13. A toy comprising:
a hollow flexible bladder having an outer wall, an inner wall, and an orifice formed through the inner and outer walls;
a noise maker assembly attached within the orifice, the noise maker assembly comprising:
a reed-type noise producing element; and
a housing for supporting the noise producing element proximate the orifice, the housing comprising—
a hollow body portion that fits within the orifice, the body portion including a sidewall having inner and outer surfaces, the inner surface defining an interior cavity with first and second open ends, wherein the noise producing element is placed within the interior cavity;
an enlarged concave-shaped head attached to the first open end of the body portion for preventing the housing from being pushed inside the bladder, the head having a diameter approximately twice a diameter of the body portion and at least one opening in pneumatic communication with the interior cavity of the body portion to permit air to pass therethrough;
only two prongs circumferentially spaced 180 degrees from each other on the side wall, each prong having a base attached to the outer wall of the body portion and a tip that extends in an upward direction and a radially outward direction from the base so as to point toward the head at an angle of between 20 degrees and 45 degrees from the outer surface, each prong being tapered from its base to its tip, the tips of the prongs being spaced approximately 0.061 inches from the head so that the bladder is sandwiched between the prongs and the head for holding the housing in the orifice and preventing the housing from being pushed into or out of the orifice in the hollow toy, the prongs being configured to retain the housing in the orifice and to permit the housing to be inserted in the orifice when the bladder is stretched near the orifice in opposite directions coinciding with the radially outward directions of the prongs such that the orifice is expanded so that the prongs can fit through the expanded orifice, the housing being wider at the head than at the tips of the prongs; and
a cap for closing the second open end of the body portion for preventing the noise producing element from escaping the housing, the cap having at least one opening in pneumatic communication with the interior cavity of the body portion to permit air to pass therethrough.

* * * * *